(12) United States Patent
Mikami et al.

(10) Patent No.: US 12,348,838 B2
(45) Date of Patent: Jul. 1, 2025

(54) SERVER, METHOD AND TERMINAL

(71) Applicant: 17LIVE, Japan Inc., Tokyo (JP)

(72) Inventors: Ryo Mikami, Tokyo (JP); Ka Ho Fong, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 18/072,323

(22) Filed: Nov. 30, 2022

(65) Prior Publication Data

US 2023/0179836 A1 Jun. 8, 2023

(30) Foreign Application Priority Data

Dec. 7, 2021 (JP) ................. 2021-198559

(51) Int. Cl.
*H04N 21/81* (2011.01)
*H04N 21/2187* (2011.01)
*H04N 21/462* (2011.01)
*H04N 21/4784* (2011.01)

(52) U.S. Cl.
CPC ..... *H04N 21/8173* (2013.01); *H04N 21/2187* (2013.01); *H04N 21/462* (2013.01); *H04N 21/4784* (2013.01)

(58) Field of Classification Search
CPC ........... H04N 21/8173; H04N 21/2187; H04N 21/462; H04N 21/4784
See application file for complete search history.

(56) References Cited

U.S. PATENT DOCUMENTS

| | | | |
|---|---|---|---|
| 2007/0137462 A1* | 6/2007 | Barros ................ | G10H 1/0058 |
| | | | 600/595 |
| 2020/0206620 A1* | 7/2020 | Hayashi ................ | A63F 13/35 |
| 2021/0306700 A1* | 9/2021 | Xie ..................... | H04N 21/4756 |

FOREIGN PATENT DOCUMENTS

| | | |
|---|---|---|
| JP | 2010-239990 A | 10/2010 |
| JP | 2021-010159 A | 1/2021 |
| JP | 2021-027455 A | 2/2021 |

(Continued)

OTHER PUBLICATIONS

Notification of Reasons for Refusal dated Apr. 19, 2020, issued in corresponding Japanese Patent Application No. 2021-198559 with English translation (8 pgs.).

(Continued)

*Primary Examiner* — Yassin Alata
(74) *Attorney, Agent, or Firm* — Pillsbury Winthrop Shaw Pittman, LLP

(57) ABSTRACT

A server includes units for: relaying video data transmitted from a user terminal where the video data is generated to a user terminal where the video data is reproduced; upon reception of a first signal indicative that a first item has been used by a reproducing user while the video data is reproduced, changing a first indicator of a first team associated with the first item in a first direction; upon reception of a second signal indicative that a second item has been used by the reproducing user while the video data is reproduced, changing a second indicator of a second team associated with the second item in a second direction opposite to the first direction; and determining a winner and a loser upon satisfaction of a predetermined condition by at least one of the first indicator of the first team or the second indicator of the second team.

4 Claims, 16 Drawing Sheets

(56) References Cited

FOREIGN PATENT DOCUMENTS

JP   2021-051763 A   4/2021
JP   2021-057686 A   4/2021

OTHER PUBLICATIONS

Decision of Refusal dated Sep. 13, 2020, issued in corresponding Japanese Patent Application No. 2021-198559 with English translation (8 pgs.).
Notice of Reasons for Refusal dated Aug. 20, 2024, issued in corresponding Japanese Patent Application No. 2022-188783, with English translation (9 pgs.).
Notice of Reasons for Refusal dated Jun. 11, 2024, issued in corresponding Japanese Patent Application No. 2022-188783 with English translation (14 pgs.).

* cited by examiner

| Stream ID | Distributor ID | Viewer ID |
|-----------|----------------|------------------|
| ST22 | 001A | SS5, SS12, SS43 |
| ST92 | 002B | TT3, TS2 |

| Event ID | Life Information | Start Time | End Time | Reward |
|---|---|---|---|---|
| EV34 | Team A :10523  Team B :15201 | Jan 1, 2021, 0:00 | Mar 31, 2021, 11:59 | 10,000 Points |
| EV99 | Team C :5678  Team D :8457 | Feb 5, 2021, 12:00 | Feb 10, 2021, 12:00 | Digital Item |

| Distributor ID | Points | Event ID | Score of Contribution |
|---|---|---|---|
| 001A | 3243 | EV34 | Team A : 1020    Team B : 0 |
| 002B | 2510 | EV34 | Team A : 0    Team B : 258 |
| 003C | 1803 | EV34 | Team A : 1520    Team B : 10 |
| 004D | 1305 | EV34 | Team A : 0    Team B : 50 |
|  |  | EV99 | Team A : 570    Team B : 0 |

| Item ID | Points to be Granted | Event ID | Effect |
|---|---|---|---|
| TT01 | 100 |  |  |
| TE01 | 150 | EV34 | +100 to Team A's Life |
| TD01 | 100 | EV34 | −50 to Team A's Life |
| VE01 | 150 | EV34 | +100 to Team B's Life |
| VD01 | 100 | EV34 | −50 to Team B's Life |

SERVER, METHOD AND TERMINAL

CROSS-REFERENCE TO RELATED APPLICATIONS

This application is based on and claims the benefit of priority from Japanese Patent Application Serial No. 2021-198559 (filed on Dec. 7, 2021), the contents of which are hereby incorporated by reference in their entirety.

TECHNICAL FIELD

The present disclosure relates to a server, a method and a terminal.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video distribution services also become popular as storage costs were reduced. In the current Reiwa period (2019-present), as the smartphones becomes more sophisticated and the networks such as 5G networks achieve further higher speed, real-time video communication services, especially live-stream services, have been rapidly gaining recognition. The number of users of live-stream services is expanding, especially among young people, as such services allow people to share fun moments even when they are in physically separate locations from each other.

Japanese Patent Application Publication No. 2021-027455 ("the '455 Publication") discloses a technology for live-streaming team competition events for the purposes of facilitating communication between video distributing users. In such events, distributors belong to teams and compete each other based on points.

In simple team competition events such as the one described in the '455 Publication, however, there is no other way for viewers to help their teams to win than to continuously throwing gifts at their favorite distributors during live-streams. Both viewers and distributors may possibly lose interest in such events quickly.

SUMMARY

In view of the above, one object of the present disclosure is to provide a technology that can enhance the attractiveness of live-streaming by organizing team competition events.

One aspect of the present disclosure relates to a server. The server includes: a relay unit for relaying video data transmitted from a user terminal where the video data is generated to a user terminal where the video data is reproduced; a first changing unit for, upon reception of a first signal, changing a first indicator of a first team associated with a first item in a first direction, the first signal being indicative that the first item has been used by a reproducing user while the video data is reproduced; a second changing unit for, upon reception of a second signal, changing a second indicator of a second team associated with a second item in a second direction opposite to the first direction, the second signal being indicative that the second item has been used by the reproducing user while the video data is reproduced; and a determining unit for determining a winner and a loser upon satisfaction of a predetermined condition by at least one of the first indicator of the first team or the second indicator of the second team.

Another aspect of the present disclosure also relates to a server. The server includes a relay unit for relaying video data transmitted from a user terminal where the video data is generated to a user terminal where the video data is reproduced; a changing unit for, upon reception of a signal, changing a first indicator of a first team in a first direction and changing a second indicator of a second team in a second direction opposite to the first direction, the signal being indicative that an item has been used by a reproducing user while the video data is reproduced; and a determining unit for determining a winner and a loser upon satisfaction of a predetermined condition by at least one of the first indicator of the first team or the second indicator of the second team.

Another aspect of the present disclosure relates to a terminal of a user reproducing video data. The terminal includes: one or more processors; and memory storing one or more computer programs configured to be executed by the one or more processors. The one or more computer programs include instructions for: reproducing video data transmitted from a terminal of a user generating the video data; permitting a first item to be used to change a first indicator of a first team in a first direction, while the video data is reproduced; and permitting a second item to be used to change a second indicator of a second team in a second direction opposite to the first direction, while the video data is reproduced.

A further another aspect of the present disclosure relates to a server. The server includes a relay unit for relaying video data transmitted from a user terminal where the video data is generated to a user terminal where the video data is reproduced; a changing unit for, upon reception of a signal, changing a first indicator of a first team in a first direction or changing a second indicator of a second team in a second direction opposite to the first direction according to a setting determined by a generating user, the signal being indicative that an item has been used by a reproducing user while the video data is reproduced; and a determining unit for determining a winner and a loser upon satisfaction of a predetermined condition by at least one of the first indicator of the first team or the second indicator of the second team.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

ADVANTAGEOUS EFFECTS

The present disclosure can make live-streaming more attractive by organizing team competition events.

BRIEF DESCRIPTION OF THE DRAWINGS

FIG. 5 is a data structure diagram of an example of a stream DB in FIG. 4.

FIG. 6 is a data structure diagram presenting an example of an event DB in FIG. 4.

FIG. 7 is a data structure diagram presenting an example of a distributor DB in FIG. 4.

FIG. 8 is a data structure diagram presenting an example of an item DB in FIG. 4.

DESCRIPTION OF THE PREFERRED EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a live-streaming system relating to an embodiment, an event is held for multiple teams competing each other. In a live-streamed video, the distributors encourage their viewers to support the victory of the team to which the distributors belong or which the distributors support, and the viewers may in response perform gifting or the like. The viewers can select a gift from two types, one of which is configured to increase the likelihood of victory or to decrease the likelihood of defeat of the distributors' team, and the other of which is configured to decrease the likelihood of victory or increase the likelihood of defeat of a team other than the distributors' team. For example, a recovery gift is configured to increase the life of the distributors' team, and an attack gift is configured to decrease the life of a rival team.

Since some gifts are designed to exert negative effects, the viewers can strategically through gifts. According to an embodiment of the present disclosure, the distributors' team can be given an advantage if the type, timing and quantity of the gifts are appropriately selected and the teams attempt to read their opponents' strategies. Therefore, the present disclosure can offer more attractive live streaming events than simple systems where participants are only allowed to throw gifts to cause their teams' score to reach a predetermined value as soon as possible.

<Configuration of Live-Streaming System>

Figure 1:
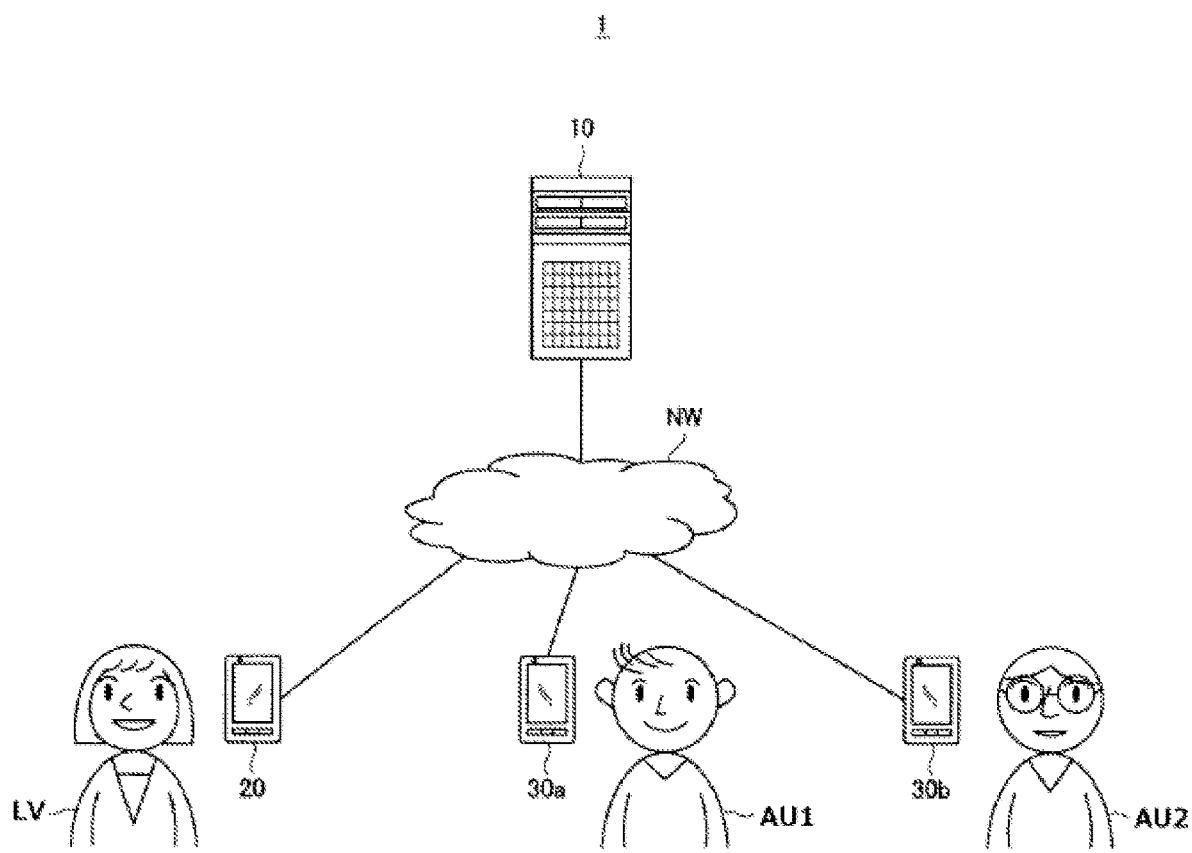
FIG. 1 schematically illustrates a configuration of a live-streaming system in one embodiment.

FIG. 1 schematically illustrates a configuration of a live-streaming system 1 according one embodiment of the disclosure. The live-streaming system 1 provides an interactive live-stream service that allows a distributor LV (also referred to as a liver or streamer) and a viewer AU (also referred to as audience) (AU1, AU2, . . . ) to communicate in real time. As shown in FIG. 1, the live-streaming system 1 includes a server 10, a user terminal 20 on the distributor side, and user terminals 30 (30a, 30b, . . . ) on the audience side. The distributor and viewers may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminals 30 are interconnected so as to be able to communicate with each other over the various wired or wireless network NW.

The live-streaming system 1 involves the distributor LV, the viewers AU, an administrator (not shown) who manages the server 10. The distributor LV is a person who broadcasts contents in real time by recording the contents with his/her user terminal 20 and uploading them directly to the server 1. Examples of the contents may include the distributor's own songs, talks, performances, fortune-telling, gameplays, and any other contents. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment and cheer via the user terminal 30, the distributor LV who is delivering the content responds to such a comment and cheer, and such response is transmitted to the viewer AU via video and/or audio, thereby establishing an interactive communication.

The term "live-streaming" may mean a mode of data transmission that allows a content recorded at the user terminal 20 of the distributor LV to be played and viewed at the user terminals 30 of the viewers AU substantially in real time, or it may mean a live broadcast realized by such a mode of transmission. The live-streaming may be achieved using existing live streaming technologies such as HTTP Live Streaming, Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay even with which interaction between the distributor LV and the viewers AU can be established. Note that the live-streaming is distinguished from so-called on-demand type transmission, in which the entire recorded data of the content is once stored on the server and the data is then provided to a user at any subsequent time upon request from the user.

The term "video data" herein refers to data that includes image data (also referred to as moving image data) generated using an image capturing function of the user terminals 20 and 30, and audio data generated using an audio input function of the user terminals 20 and 30. Video data is played back on the user terminals 20 and 30, so that the users can view contents.

Figure 2:
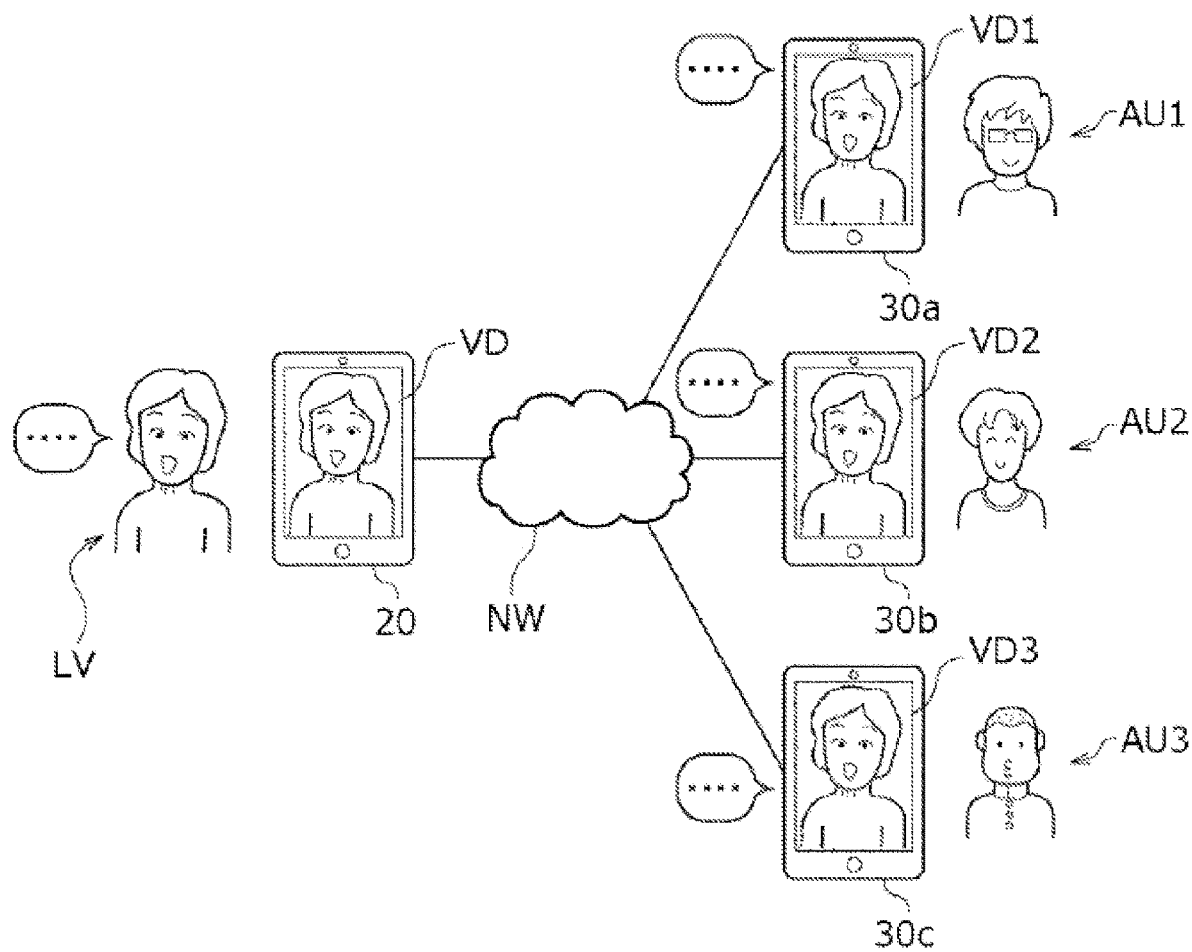
FIG. 2 schematically illustrates an example of live-streaming implemented by the live-streaming system of FIG. 1.

FIG. 2 schematically illustrates an example of live-streaming implemented by the live-streaming system of FIG. 1. In the example in FIG. 2, the distributor LV is live-streaming his/her talk. The user terminal 20 of the distributor LV generates video data by recording images and sounds of the distributor LV talking, and the generated data is transmitted to the server 10 (not shown in FIG. 2) over the network NW. At the same time, the user terminal 20 displays a recorded video image VD of the distributor LV on the display of the user terminal 20 to allow the distributor LV to check the live stream currently performed.

The user terminals 30a, 30b, and 30c of the viewers AU1, AU2, and AU3, respectively, who have requested the platform to view the live-stream of the distributor LV, receive video data related to the live-stream (may also be herein referred to as "live-streaming video data") over the network NW and reproduce the received video data to display video images VD1, VD2, and VD3 on the displays and output audio through the speakers. The videos VD1, VD2, and VD3 displayed at the user terminals 30a, 30b, and 30c, respectively, are substantially the same as the video image VD captured by the user terminal 20 of the distributor LV, and the audio outputted at the user terminals 30a, 30b, and 30c is substantially the same as the audio recorded by the user terminal 20 of the distributor LV.

Recording of the images and sounds at the user terminal 20 of the distributor LV and reproduction of the video data at the user terminals 30a, 30b, 30c of the viewers AU1, AU2, AU3 are performed substantially simultaneously. Once the viewer AU1 types a comment about the talk of the distributor LV on the user terminal 30a, the server 10 displays the comment on the user terminal 20 of the distributor LV in real time and also displays the comment on the user terminals 30a, 30b, and 30c of the viewers AU1, AU2, and AU3, respectively. When the distributor LV reads the comment and develops his/her talk to cover and respond the comment, the video and sound of the talk are displayed on the user terminals 30a, 30b, 30c of the viewers AU1, AU2, AU3 respectively. This interactive action is recognized as establishment of a conversation between the distributor LV and the viewer AU1. In this way, the live-streaming system 1 realizes the live-streaming that enables the interactive communication, not one-way communication.

Figure 3:
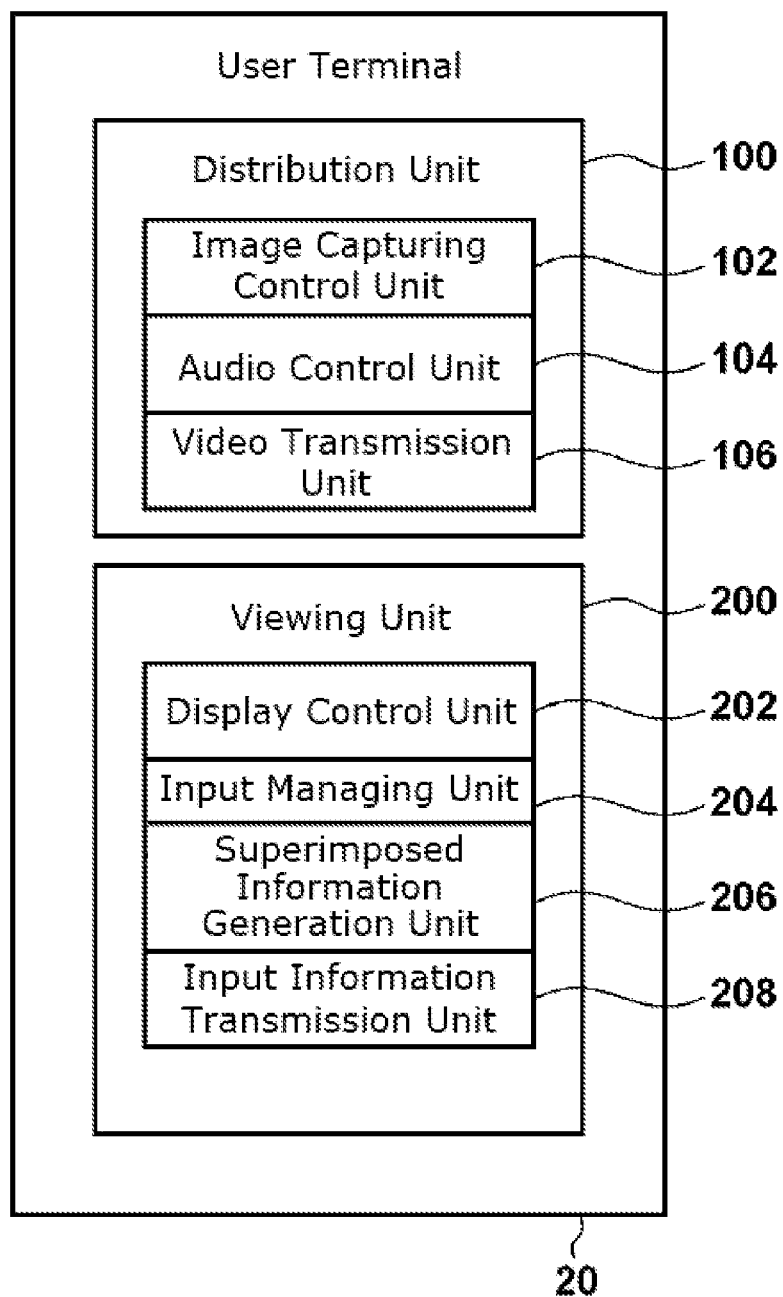
FIG. 3 is a block diagram showing functions and configuration of a user terminal shown in FIG. 1.

FIG. 3 is a block diagram showing functions and configuration of the user terminal 20 of FIG. 1. The user terminals 30 have the same functions and configuration as the user terminal 20. Each block in FIG. 3 and the subsequent block diagrams may be realized by elements such as a computer CPU or a mechanical device in terms of hardware, and can be realized by a computer program or the like in terms of software. Functional blocks are realized by cooperative operation between these elements. Therefore, it is understood by those skilled in the art that these functional blocks can be realized in various forms by combining hardware and software.

The distributor LV and the viewers AU download and install a live-streaming application program (hereinafter referred to as a live-streaming application) according to the embodiment to the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by (processors such as CPUs of) the user terminals 20 and 30 running the live-streaming application will be described as functions of the user terminals 20 and 30. These functions are realized in practice by the live-streaming application on the user terminals 20 and 30. In any other embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 20 includes a distribution unit 100 that generates video data in which the user's image and sound are recorded and provides the video data to the server 10, and a viewing unit 200 to which the video data is provided from the server 10 to reproduce the video data. The user activates the distribution unit 100 when the user performs live-streaming, and activates the viewing unit 200 when the user views a video. The user terminal in which the distribution unit 100 is activated is the distributor's terminal, i.e., the user terminal that generates the video data, and the user terminal in which the viewing unit 200 is activated is the viewer's terminal, i.e., the user terminal in which the video data is reproduced and played.

The distribution unit 100 includes an image capturing control unit 102, an audio control unit 104, and a video transmission unit 106. The image capturing control unit 102 is connected to a camera (not shown in FIG. 3) and controls image capturing performed by the camera. The image capturing control unit 102 obtains image data from the camera. The audio control unit 104 is connected to a speaker and a microphone (not shown in FIG. 3) and controls audio output through the speaker and audio input via the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The viewing unit 200 includes a display control unit 202, an input managing unit 204, a superimposed information generation unit 206, and an input information transmission unit 208. The display control unit 202 is connected to the display, which is not shown in FIG. 3, and configured to cause the display to present moving images and screens. When the display control unit 202 and audio control unit 104 reproduce video data, an image is outputted to the display and audio is outputted from the speaker. This can be referred to as "the video data is played". The input managing unit 204 is connected to input means (not shown in FIG. 3) such as touch panels, keyboards, and displays, and obtains user input via these input means. The superimposed information generation unit 206 superimposes a predetermined frame image on an image generated from the video data from the server 10. The frame image includes various user interface objects (hereinafter simply referred to as "objects") for accepting inputs from the user, comments entered by the viewers, and information obtained from the server 10. The input information transmission unit 208 transmits the user input obtained by the input managing unit 204 to the server 10 over the network NW.

Figure 4:
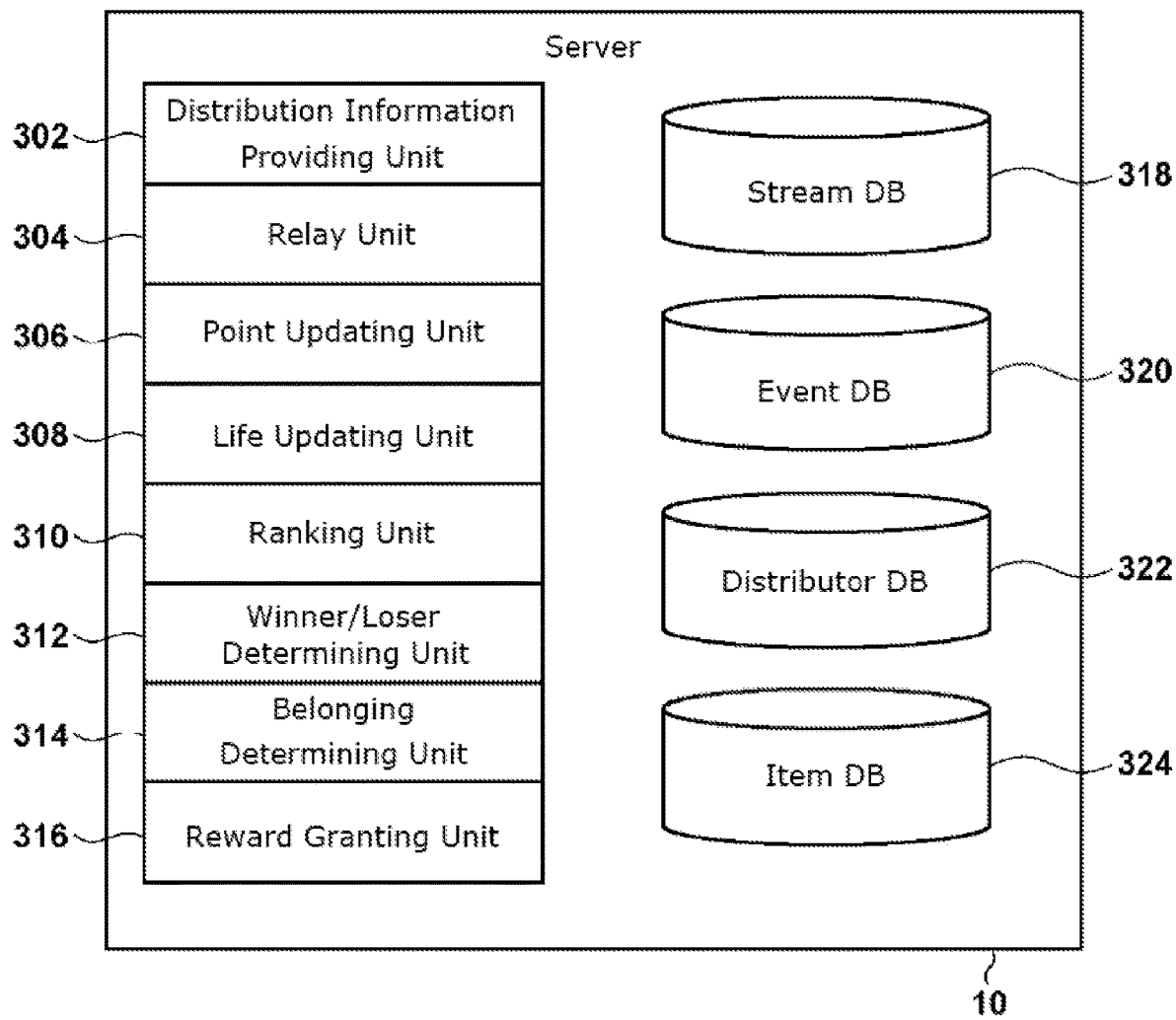
FIG. 4 is a block diagram showing functions and configuration of a server shown in FIG. 1.

FIG. 4 is a block diagram showing functions and configuration of the server 10 of FIG. 1. The server 10 includes a distribution information providing unit 302, a relay unit 304, a point updating unit 306, a life updating unit 308, a ranking unit 310, a winner/loser determining unit 312, a belonging determining unit 314, a reward granting unit 316, a stream DB 318, an event DB 320, a distributor DB 322, and an item DB 324.

FIG. 5 is a data structure diagram showing an example of the stream DB 318 of FIG. 4. The stream DB 318 holds information regarding live-streams currently taking place. The stream DB 318 stores a stream ID for identifying a live-stream on a live-streaming platform provided by the live-streaming system 1, a distributor ID for identifying the distributor who provides the live-stream, and a viewer ID for identifying a viewer of the live-stream, in association with each other.

FIG. 6 shows a data structure diagram presenting an example of the event DB in FIG. 4. The event DB 320 stores information on events being held on the live-streaming platform. The event DB 320 stores an event ID identifying an event where multiple teams compete against each other, information on the lives of the teams, the start time of the event, the end time of the event, and information on reward to be granted to the winner of the event, in association with each other.

Here, an event starts at a start time and ends at an end time. Distributors sign up for the event, and the event is to be won by one of the teams for which the distributors can collect the largest number of event-specific items dedicated for the event from viewers within a predetermined period of time (defined by the start and end times). Each team is associated with an indicator, for example, a life. The life can be increased or decreased depending on how many event-specific items are collected from the viewers by the distributors who have registered to participate in the event. Other examples of the indicator include the number of stars, the number of stamps, puzzle pieces, etc. The indicator can be construed as a parameter for determining whether the team wins or loses. A reward to be granted may be, for example, a predetermined number of points, money, digital items, or event-specific digital decorative parts.

Various rules can be set up according to which teams win or lose. The following shows examples.

(1) The team whose life reaches the upper limit first wins.
(2) The team whose life reaches the lower limit loses, and the game continues until only one team is left.
(3) Combination of (1) and (2).

In the present embodiment, the number of teams participating in the event is two. The teams compete by a combination of rules: (1) the team whose life reaches the lower limit or 0 within the period of the event is defeated (this means that the other team wins); (2) the team whose life reaches the upper limit or 20,000 within the period of the event wins; and (3) if neither of the teams wins by the end of the event, the team with the larger life at the end of the event wins.

FIG. 7 is a data structure diagram presenting an example of the distributor DB 322 in FIG. 4. The distributor DB 322 stores information on distributors. The distributor DB 322 stores a distributor ID identifying a distributor, points owned by the distributor, an event ID identifying an event for which the distributor signs up, and a score of contribution made by the distributor in the event, in association with each other.

The points are an electronic representation of value circulated in the live-streaming platform. If the distributor receives an item given by a viewer while streaming a live video, the distributor's points increase by a value associated with the item. The points are used, for example, to determine the amount of reward or money the distributor receives from the administrator of the live-streaming platform. The score of contribution is a value indicating the contribution made by the distributor to each team. The score of contribution is configured in association with a particular combination of an event, a team and a distributor. The score of contribution is an indicator of contribution made by a given distributor to a given team in a given event.

The distributor signs up for the event in an appropriate manner. For example, the distributor accesses the live-streaming platform through the user terminal 20 of the distributor's side. The server 10 refers to the event DB 320 to identify events in which the distributor can participate, and causes the user terminal 20 to display an event presentation page including information on the identified events. Once the distributor specifies an event of interest, the user terminal 20 displays on its display an event sign-up page for the specified event. The distributor may indicate his/her intention to participate in the event through the event sign-up page. In this case, the server 10 updates the distributor DB 322 such that the event ID of the event is associated with the distributor ID of the distributor who has expressed his/her intention to participate in the event.

FIG. 8 is a data structure diagram presenting an example of the item DB 324 in FIG. 4. The item DB 324 stores information on items available for viewers of a live stream. The item DB 324 stores an item ID identifying an item, points to be granted to a distributor to whom the item is sent, an event ID identifying, if the item is dedicated to an event, the event, and an effect on the life of a distributor who has signed up for the event if the item is used in a live stream, in association with each other. While watching a live stream, a viewer can give a desired item to a distributor (may be referred to as "throw a desired item" by paying a price equivalent to the points to be granted the desired item. The payment may be electronically made as appropriate. For example, the viewer may pay, to the administrator, points equivalent to the points to be granted. Alternatively, bank transfers or credit card payments may be available. The effect on the life includes increasing and decreasing the life of a team targeted by the item. The amount of increase or decrease is determined by the price of the item.

Referring again to FIG. 4, upon reception of a notification from the user terminal 20 on the distributor side to start a live-stream over the network NW, the distribution information providing unit 302 registers in the stream DB 318 a stream ID identifying this live-stream and a distributor ID identifying the distributor who hosts the live-stream. When receiving a request to provide information about live-streams from the viewing unit 200 of the user terminal 30 on the viewer side over the network NW, the distribution information providing unit 302 retrieves currently available live-streams from the stream DB 318 and makes a list of them. The distribution information providing unit 302 refers to the distributor DB 322 and the event DB 320 and generates event information that associates the distributors of the live streams in the list and the events in which the distributors participate. The distribution information providing unit 302 transmits the generated list and event information to the requesting user terminal 30 over the network NW. The display control unit 202 of the requesting user terminal 30 generates a live-stream selection screen based on the received list and event information, and displays it on the display of the user terminal 30.

Once the input information transmission unit 208 of the user terminal 30 receives the viewer's selection on the live-stream selection screen, the input information transmission unit 208 generates a distribution request including the stream ID of the selected live-stream, and transmits the request to the server 10 over the network NW. The distribution information providing unit 302 starts providing, to the requesting user terminal 30, the live-stream specified by the stream ID included in the received distribution request. The distribution information providing unit 302 updates the stream DB 318 to include the viewer ID of the viewer using the requesting user terminal 30 into the viewer IDs associated with the stream ID.

The relay unit 304 relays the video data from the distributor-side user terminal 20 to the viewer-side user terminal 30 in the live-streaming started by the distribution information providing unit 302. The relay unit 304 receives from the input information transmission unit 208 a signal that represents user input by the viewer during reproduction of the video data on the viewer-side user terminal 30. The signal representing the user input may be an item usage signal indicating that an item has been used. The item usage signal includes the viewer ID of the viewer, the distributor ID of the distributor to whom the item is given (the distributor ID of the distributor hosting the live-stream watched by the viewer who has given the item), and the item ID of the item.

Upon reception of the item usage signal by the relay unit 304, the point updating unit 306 updates the distributor DB 322 such that the points owned by the distributor increase by an amount corresponding to the points to be granted by the used item. The point updating unit 306 refers to the item DB 324 to identify the points to be granted which are associated with the item ID included in the received item usage signal. The point updating unit 306 updates the distributor DB 322 to add the identified points to the points associated with the distributor ID included in the item usage signal.

Upon reception of an item usage signal relating to an event-specific item by the relay unit 304, the life updating unit 308 increases or decreases the life of the team associated with the event-specific item. There are several types of event-specific items, and each is designed to increase or decrease the life of a particular team. The life updating unit 308 updates the distributor DB 322 such that the score of contribution made by the corresponding distributor increases by an amount proportional to the amount of increase or decrease in the life.

The life updating unit 308 refers to the item DB 324 to identify the event ID and effect associated with the item ID included in the received item usage signal. If no event ID is registered, this means that the item is not dedicated to the event. In this case, the life updating unit 308 neither increases nor decreases the life. If the identified effect indicates that the life of a certain team should increase by a certain amount, the life updating unit 308 updates the event DB 320 such that the life of the certain team increases by the certain amount. In addition to this, the life updating unit 308 updates the distributor DB 322 such that the score of contribution to the team, from among the scores of contribution associated with the distributor ID included in the received item usage signal, increases by the certain amount. If the identified effect indicates that the life of a certain team should decrease by a certain amount, the life updating unit 308 updates the event DB 320 such that the life of the certain team decreases by the certain amount. In addition to this, the life updating unit 308 updates the distributor DB 322 such that the score of contribution to a competitor team against the certain team, from among the scores of contribution associated with the distributor ID included in the received item usage signal, increases by the certain amount. For example, when the distributor ID is "001A", the event ID is "EV34" and the identified effect is "Decrease Team B's Life by 50", the life updating unit 308 reduces by 50 the life of Team B corresponding to the event ID "EV34" in the event DB 320. The life updating unit 308 adds 50 to the score of contribution made by the distributor ID "001A" to Team A (not Team B) in the distributor DB 322. As noted, an event-specific item may influence a life and a score of contribution in the same direction, or in opposite directions.

The ranking unit 310 refers to the distributor DB 322 and ranks contributions made to each of the teams competing in the event based on the scores of contribution. The ranking unit 310 refers to the distributor DB 322 and ranks all of the distributors based on their points.

Upon satisfaction of a certain condition by at least one of the life of one of the teams involved in the event or the life of the other team, the winner/loser determining unit 312 determines which one of the teams wins. If the life of a certain team reaches the lower limit or 0 within the period of the event, the winner/loser determining unit 312 determines that the certain team is defeated and the other team wins. If the life of a certain team reaches the upper limit or 20,000 within the period of the event, the winner/loser determining unit 312 determines that the certain team wins. If the winner is not determined by the end of the event, the winner/loser determining unit 312 determines that the team with a life having a greater value at the end of the event wins.

The belonging determining unit 314 determines, based on the scores of contribution, to which one of the teams involved in the event each of the distributors registered to participate in the event belongs. The belonging determining unit 314 refers to the distributor DB 322 and determines that each of the distributors signing up for the event belongs to one of the teams to which the distributor makes more contribution. For example, referring to the distributor DB 322 in FIG. 7, the belonging determining unit 314 determines that the distributor with the distributor ID "001A" belongs to Team A in the event with the event ID of "EV34". In the present embodiment, it is automatically determined which team the distributors belong to based on their scores of contribution, not determined by the distributors' advanced declaration. In this manner, distributors are not required to declare which team they belong to when signing up for events. This can lower the hurdle for distributors to sign up for events and encourage distributors to participate in events. For example, distributors can be encouraged to participate in events during the course of the events. A distributor may know an ongoing event and desire to join the event. In this case, the distributor can no longer satisfy the requirement of "advanced team registration." According to the present embodiment, the advanced team registration is not required and the distributor can participate in the event without problems.

The reward granting unit 316 grants rewards to distributors belonging to the team determined to have won by the winner/loser determining unit 312. The reward granting unit 316 determines the distributors belonging to the winning team based on the determination made by the belonging determining unit 314. The reward granting unit 316 refers to the event DB 320 to identify the reward associated with the event ID of the event for which the winner/loser determining unit 312 has determined the winning team. The reward granting unit 316 performs necessary steps to give the identified reward to the identified distributors. If the reward is a predetermined number of points, the reward granting unit 316 divides the points by the number of distributors, for example, and updates the distributor DB 322 such that the resulting points are added to the points of each distributor.

Figure 9:
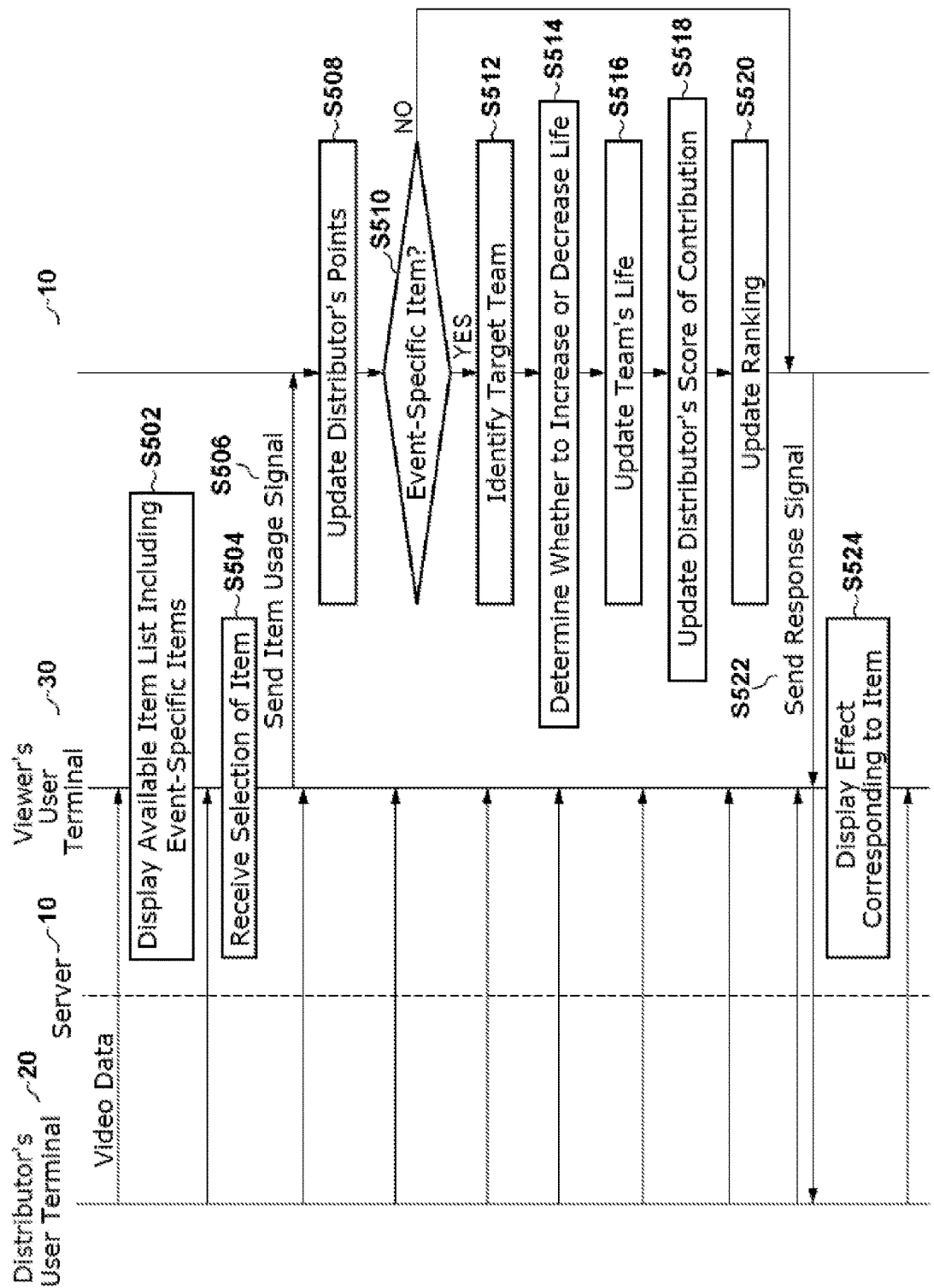
FIG. 9 is a chart showing a series of steps performed by the live-streaming system shown in FIG. 1.

The operation of the live-streaming system 1 with the above configuration will be now described. FIG. 9 is a chart showing a series of steps performed in the live streaming system 1. It is assumed that the viewer accesses the live-stream platform from the user terminal 30, selects a desired live-stream on the live-stream selection screen, and starts viewing the selected live-stream. It is also assumed that the distributors of the live-stream are taking part in the event. While the viewer is watching the live-stream, the video data is continuously transmitted from the distributor's user terminal 20 to the viewer's user terminal 30 via (the relay unit 304 of) the server 10.

During the reproduction of the video data, the viewer performs user input for requesting display of an item via input means of the user terminal 30. Upon receipt of this user input, the input information transmission unit 208 of the user terminal 30 generates an item information request including the distributor ID of the distributor of the live-stream being reproduced and transmits the item information request to the server 10. When receiving the item information request, the relay unit 304 of the server 10 refers to the distributor DB 322 to identify the event ID associated with the distributor ID included in the received item information request. The relay unit 304 refers to the item DB 324 to identify item IDs associated with the identified event ID (i.e., item IDs of items dedicated to the specified event) and item IDs indicating items with which no event ID is associated. The relay unit 304 generates an item information response including the identified item IDs and transmits it to the user terminal 30. The superimposed information generation unit 206 of the user terminal 30 includes, into the frame image, an image of an available item list that lists images of the items identified by the item IDs included in the item information response. The display control unit 202 causes the display to display the video image on which the frame image is superimposed (S502). The images of the items include images of event-specific items.

In the present example, if the distributor is not participating in the event, the item ID of the event-specific item is not sent to the viewer's user terminal 30. In other words, the relay unit 304 is configured to allow the viewer to use event-specific items while the video data is reproduced, if the distributor participates in the event.

Once the input managing unit 204 receives selection of an item made by the viewer, that is, designation of an item image (S504), the input information transmission unit 208 generates an item usage signal that includes the item ID of the designated item, the viewer ID, and the distributor ID, and transmits the item usage signal to the server 10 over the network NW (S506). The relay unit 304 of the server 10 reduces the points owned by the viewer indicated by the viewer ID included in the received item usage signal, by an amount equal to the points to be granted by the item identified by the item ID included in the item usage signal. This means that payment has been made for the item.

The point updating unit 306 of the server 10 accesses the distributor DB 322 to update the points owned by the distributor identified by the distributor ID included in the item usage signal (S508). The point updating unit 306 increases the points owned by the distributor by an amount equal to the points to be granted by the item identified by the item ID included in the item usage signal.

The life updating unit 308 determines whether the item identified by the item ID included in the item usage signal is an event-specific item (S510). The life updating unit 308 refers to the item DB 324. If an event ID is registered in association with the item ID, the life updating unit 308 determines that the item identified by the item ID is an item dedicated to the event identified by the event ID. If no event ID is registered, the life updating unit 308 determines that the item is not an event-specific item, and the process moves to a step S522, which will be described below.

If the item is determined to be an event-specific item (YES in S510), the life updating unit 308 identifies the team whose life is to be updated (S512). The life updating unit 308 refers to the item DB 324 to identify the effect associated with the item ID. The life updating unit 308 identifies the team whose life is to be increased or decreased, based on the identified effect.

The life updating unit 308 determines whether to increase or decrease the life (S514). The life updating unit 308 refers to the item DB 324 to identify the effect associated with the item ID. The life updating unit 308 determines whether to increase or decrease the life based on the identified effect and also determines the amount of the change.

Based on the identification done in the step S512 and the determination made in the step S514, the life updating unit 308 updates the team's life (S516). The life updating unit 308 accesses the event DB 320 and changes the life of the team identified in step S512 by the amount and in the direction determined in the step S514.

Based on the identification done in the step S512 and the determination made in the step S514, the life updating unit 308 updates the distributor's score of contribution (S518). The life updating unit 308 accesses the distributor DB 322 to update the score of contribution made by the distributor identified by the distributor ID included in the item usage signal in the following manner.

(1) If the amount and direction identified in the step S514 indicates that the life is to be increased by a predetermined amount,
  the life updating unit 308 increases the score of contribution made by the distributor to the team identified in the step S512, by a predetermined amount.

(2) If the amount and direction identified in the step S514 indicates that the life is to be decreased by a predetermined amount,
  the life updating unit 308 increases the score of contribution made by the distributor to the team competing against the team identified in the step S512, by a predetermined amount.

The ranking unit 310 updates the ranking of the contributions based on the result of the update done in step S518 (S520).

The relay unit 304 generates a response signal and sends the response signal to the viewer's user terminal 30 and the distributor's user terminal 20 over the network NW (S522). The response signal includes the item ID of the item that has triggered updating of the points and life, information on the lives of all the teams involved in the event, which includes the information on the life updated in the step S516, and information on the ranking of the contributions updated in the step S520.

The display control unit 202 of the viewer's user terminal 30 generates an effect corresponding to the item ID included in the response signal, and causes the display to present the generated effect (S524). The display control unit 202 may cause the display to present other information included in the response signal.

Figure 10:
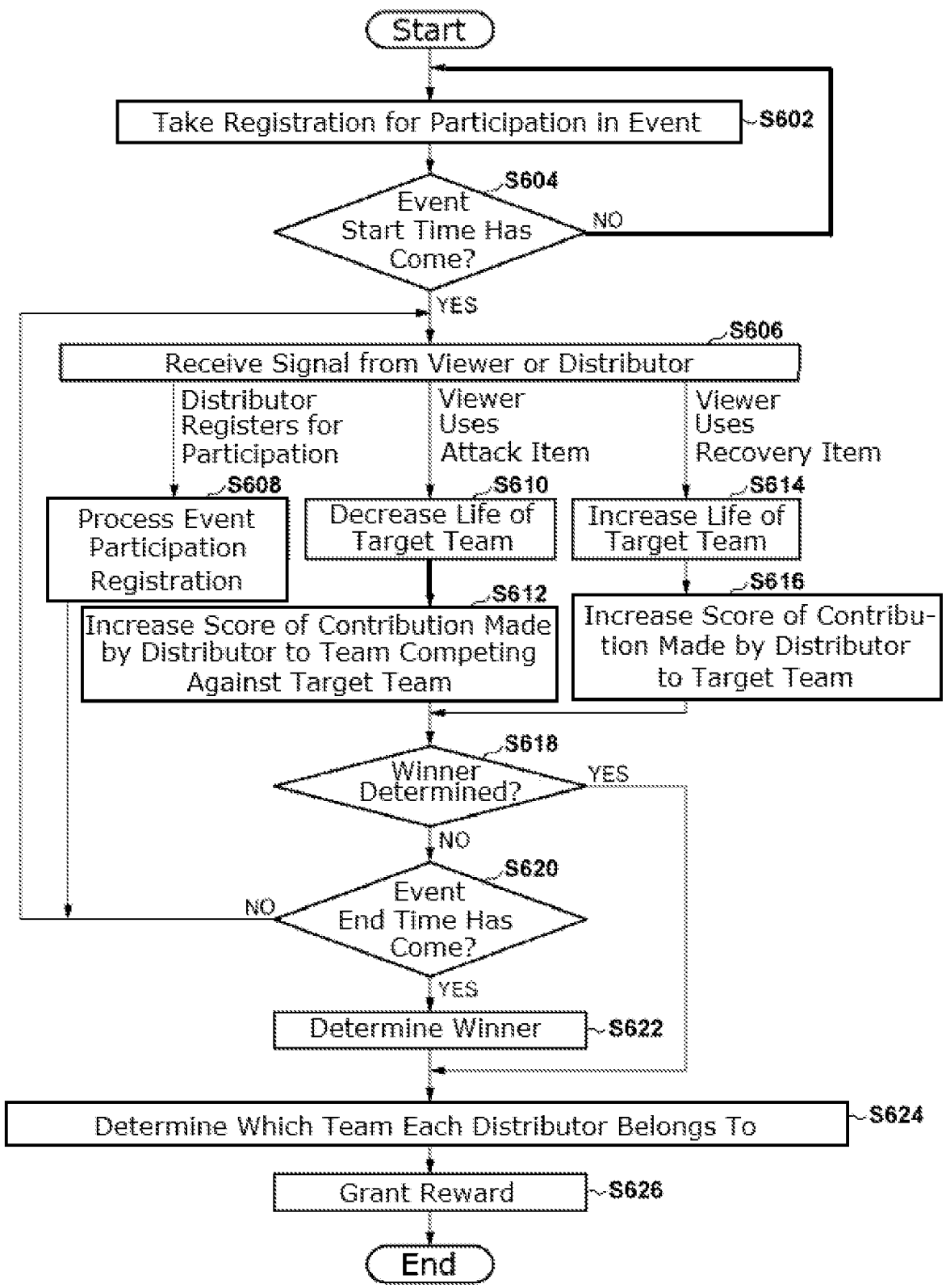
FIG. 10 is a flowchart showing a series of steps of processing an event on the server of FIG. 1.

FIG. 10 is a flowchart showing a series of steps of processing an event on the server 10. The server 10 takes an event participation registration from the distributor before the event starts (S602). The server 10 determines whether the start time of the event has come (S604). If the start time has not come (NO in S604), the process returns to the step S602 of taking event participation registrations. If the time has come (YES in S604), the event starts.

The server 10 receives a signal from the viewer or distributor within the period of the event (S606). If the signal received by the server 10 indicates that the distributor desires to register for participation in an event, the server 10 processes the event participation registration in the same manner as in the step S602 (S608), and the process returns to the step S606. If the signal received in the step S606 indicates that the viewer has used an attack item (an item producing an effect of reducing the life of the target team), the server 10 reduces the life of the team that has been attacked (S610), and increases the score of contribution made by the distributor (the distributor of the live-stream in which the viewer has thrown the attack item) to the competitor team against the attacked team (S612). If the signal received in the step S606 indicates that the viewer has used a recovery item (an item producing an effect of increasing the life of the target team), the server 10 increases the life of the team that has been saved by the recovery item (S614), and increases the score of contribution made by the distributor (the distributor of the live-stream in which the viewer has thrown the recovery item) to the team saved by the recovery item (S616).

Following the steps S612 and S616, the server 10 determines whether the winner has been decided (S618). Specifically, the server 10 determines whether the life of any one of the teams has reached 0 or 20000. If the winner is determined (YES in S618), the process moves to a step S624, which will be described below. If the winner is not determined (NO in S618), the server 10 determines whether the end time of the event has come (S620). If the end time has not come yet (NO in S620), the process returns to the step S606. If the end time has come (YES in S620), the server 10 determines the winner (S622). Specifically, the server 10 determines the team having a life of a greater value as the winner. The server 10 refers to the scores of contribution made by each distributor to the teams to determine which one of the teams each distributor belongs to (S624). The server 10 performs steps to grant a predetermined reward to the distributor belonging to the winning team (S626).

Figure 11:
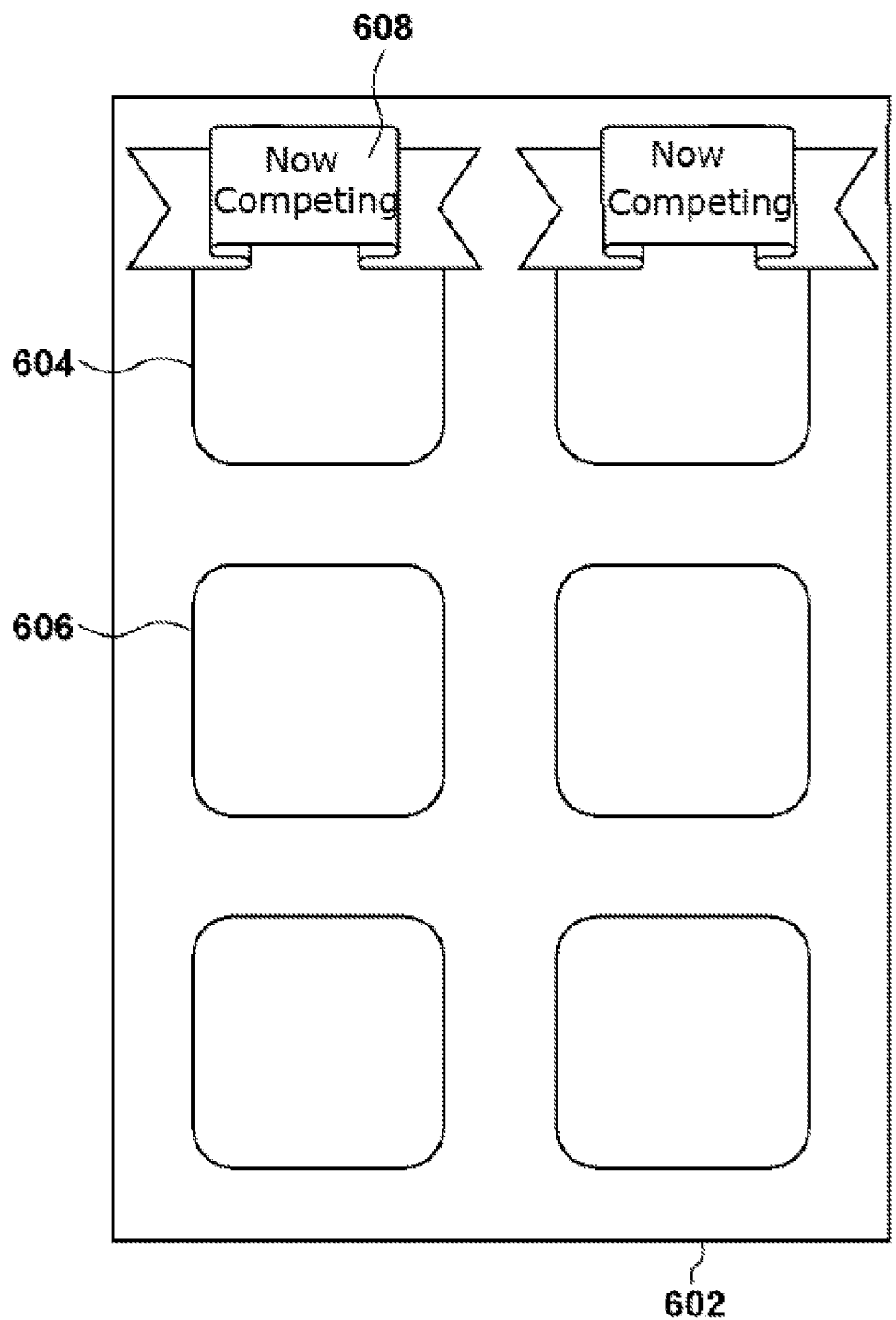
FIG. 11 is a representative screen image of a live-streaming selection screen displayed on a display of a viewer's user terminal.

FIG. 11 is a representative screen image of the live-stream selection screen 602 displayed on the display of the viewer's user terminal 30. The live-stream selection screen 602 includes thumbnails 604 and 606 indicating live-streams in the list of currently available live streams. The display control unit 202 refers to the event information and has the thumbnails 604 and 606 displayed in different manners. The thumbnail 604 shows the live-stream of the distributor participating in the event, and the thumbnail 606 shows the live-stream of a different distributor who is not participating in the event. The thumbnail 604 of the live-stream of the distributor participating in the event has an object 608 added that indicates that the distributor is participating in the event.

Figure 12:
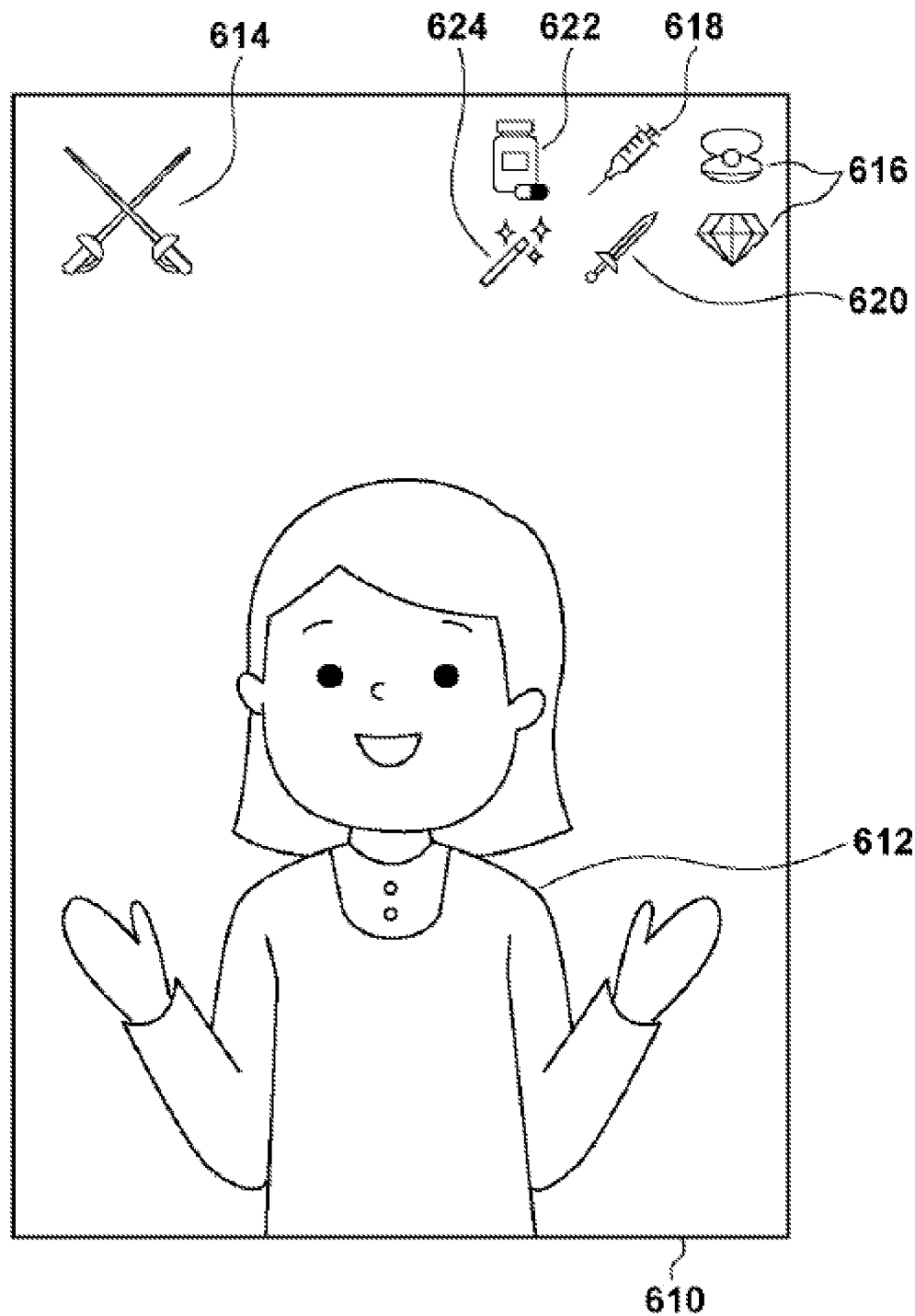
FIG. 12 is a representative screen image of a live-streaming room screen displayed on the display of the viewer's user terminal.

FIG. 12 is a representative screen image of a live-streaming room screen 610 shown on the display of the viewer's user terminal 30. Once the viewer taps the thumbnail showing the live-stream of the distributor participating in the event on the live-stream selection screen 602 of FIG. 11, the live-streaming room screen 610 of FIG. 12 is shown on the display. The live-streaming room screen 610 includes a distributor image 612 obtained by reproducing the video data, an event participation mark 614 that is an object indicating that the distributor is participating in the specific event, and an image of an available item list. The image of the available item list shows a normal item 616, an event-specific recovery item 618 and an event-specific attack item 620 for Team A, and an event-specific recovery item 622 and an event-specific attack item 624 for Team B.

The event participation mark 614 indicates that the distributor signs up for the given event. In the present embodiment, it is not known which team the distributor belongs to before the event starts. The event participation mark 614 does not show the team to which the distributor belongs. In other words, the same event participation mark 614 is displayed for all of the distributors who have registered to participate in the event. The display control unit 202 causes the display to present the items 616, 618, 620, 622, 624 based on the item information response received from the server 10 in response to the thumbnail being tapped. The display control unit 202 causes the display to present the event-specific attack and recovery items 618, 620, 622, and 624 so that these items become available. If the distributor is not registered to participate in the event, these event-specific attack and recovery items are not displayed and thus not available for use.

The distributor tells the viewer through the live-stream which team he/she belongs to or want to belong to, and asks the viewer to use the event-specific recovery or attack items for the team to which the distributor belongs. For example, the distributor may tell the viewer that he/she wants to belong to Team A, and the viewer may tap the event-specific recovery item 618 for Team A. If the viewer taps the event-specific recovery item 618 for Team A, the points equal to the price of the event-specific recovery item 618 are subtracted from the viewer's points, and the points to be granted by the event-specific recovery item 618 are added to the distributor's points. In addition, the life of Team A is increased by a predetermined amount, and the score of contribution made by the distributor to Team A is increased by a predetermined amount. If the viewer taps the event-specific attack item 620 for Team A, the points equivalent to the price of the event-specific attack item 620 are subtracted from the points of the viewer, and the points to be granted by the event-specific attack item 620 are added to the distributor's points. In addition, the life of Team B is reduced by a predetermined amount, and the score of contribution made by the distributor to Team A is increased by a predetermined amount.

Figure 13:
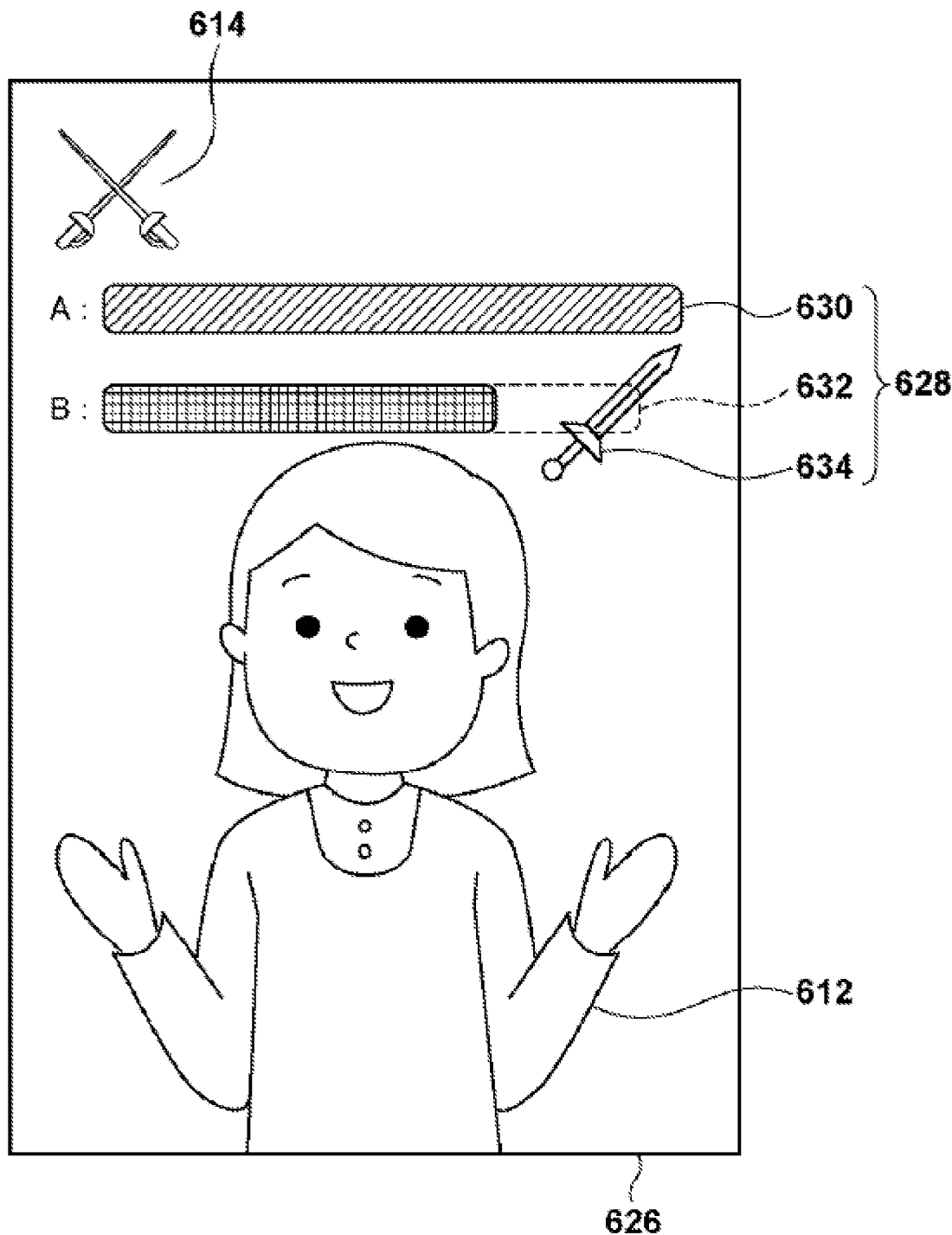
FIG. 13 is a representative screen image of an event effect screen displayed on the display of the viewer's user terminal.

FIG. 13 is a representative screen image of the event effect screen 626 displayed on the display of the viewer's user terminal 30. On the live-streaming room screen 610 shown in FIG. 12, the viewer may tap the event-specific attack item 620 for Team A. In this case, an item usage signal is generated and sent from the user terminal 30 to the server 10. The user terminal 30 receives a response signal made in response to the item usage signal from the server 10, and generates the event effect screen 626 shown in FIG. 13 based on the received response signal, and has the display to display the event effect screen 626.

The event effect screen 626 shows the distributor image 612, the event participation mark 614, and an object 628 showing the effect produced by the event-specific attack item 620. The object 628 includes Team A's life 630, Team B's life 632, and an image 634 indicating that an attack item has been used. The display control unit 202 generates an image 634 based on the item ID included in the response signal. The display control unit 202 generates Team A's life 630 and Team B's life 632 based on the updated information on the lives of all teams included in the response signal. The viewer can see the effect on the event effect screen 626, so that he/she can see what effect is produced by the attack item used by him/her. For example, the distributor may react in any manner to the use of the attack item. This may further enforce the sense of unity between the distributor and the viewer.

Figure 14:
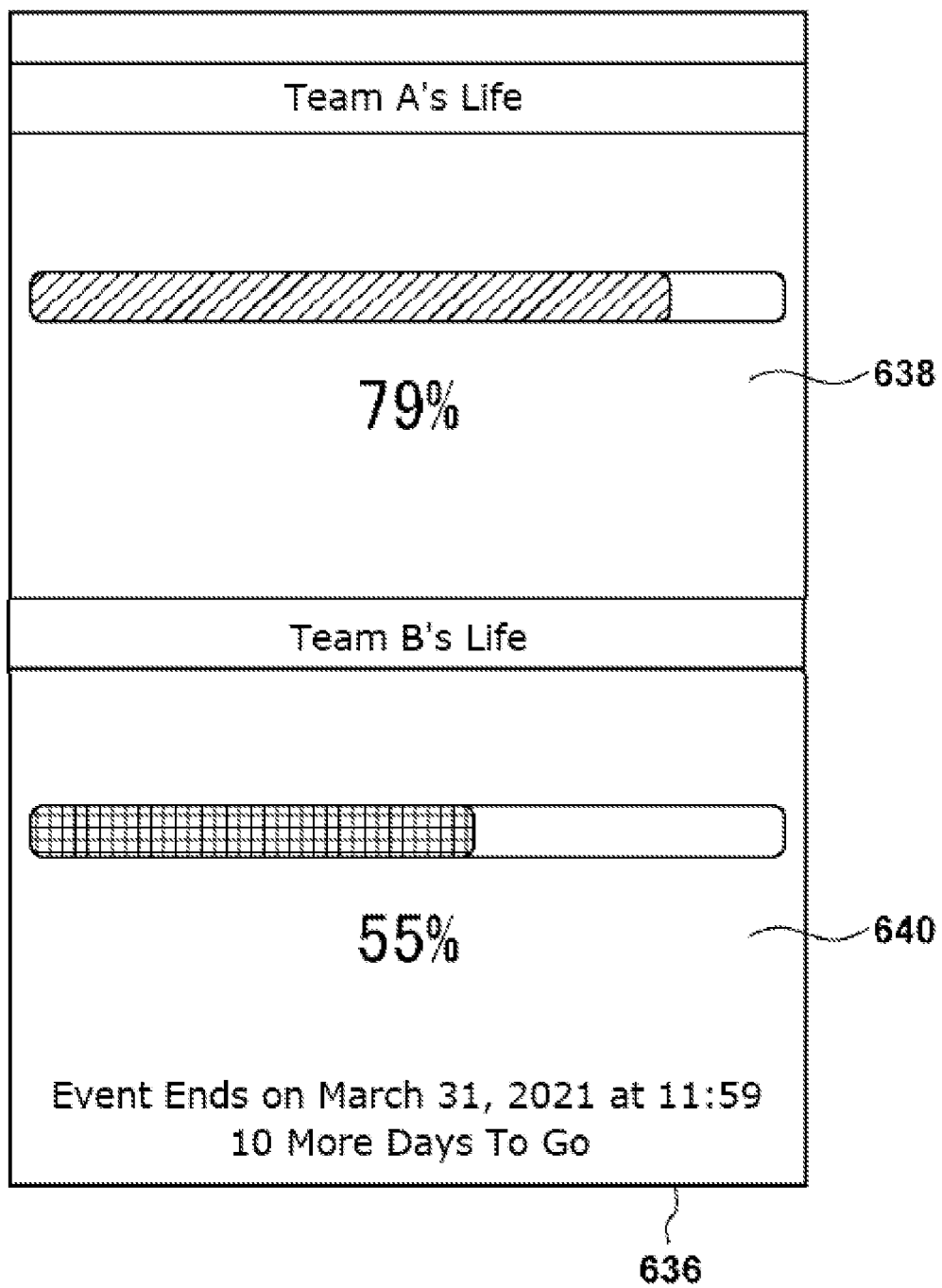
FIG. 14 is a representative screen image of a life checking screen displayed on the display of the viewer's user terminal.

FIG. 14 is a representative screen image of a life checking screen 636 displayed on the display of the viewer's user terminal 30. During the live-stream, the display of the distributor's user terminal 20 may display a screen showing the same information as the life checking screen 636. The life checking screen 636 has a status display area 638 showing the life of Team A and a status display area 640 showing the life of Team B. The display control unit 202 may generate the life checking screen 636 by referring to the event DB 320 of the server 10.

Figure 15:
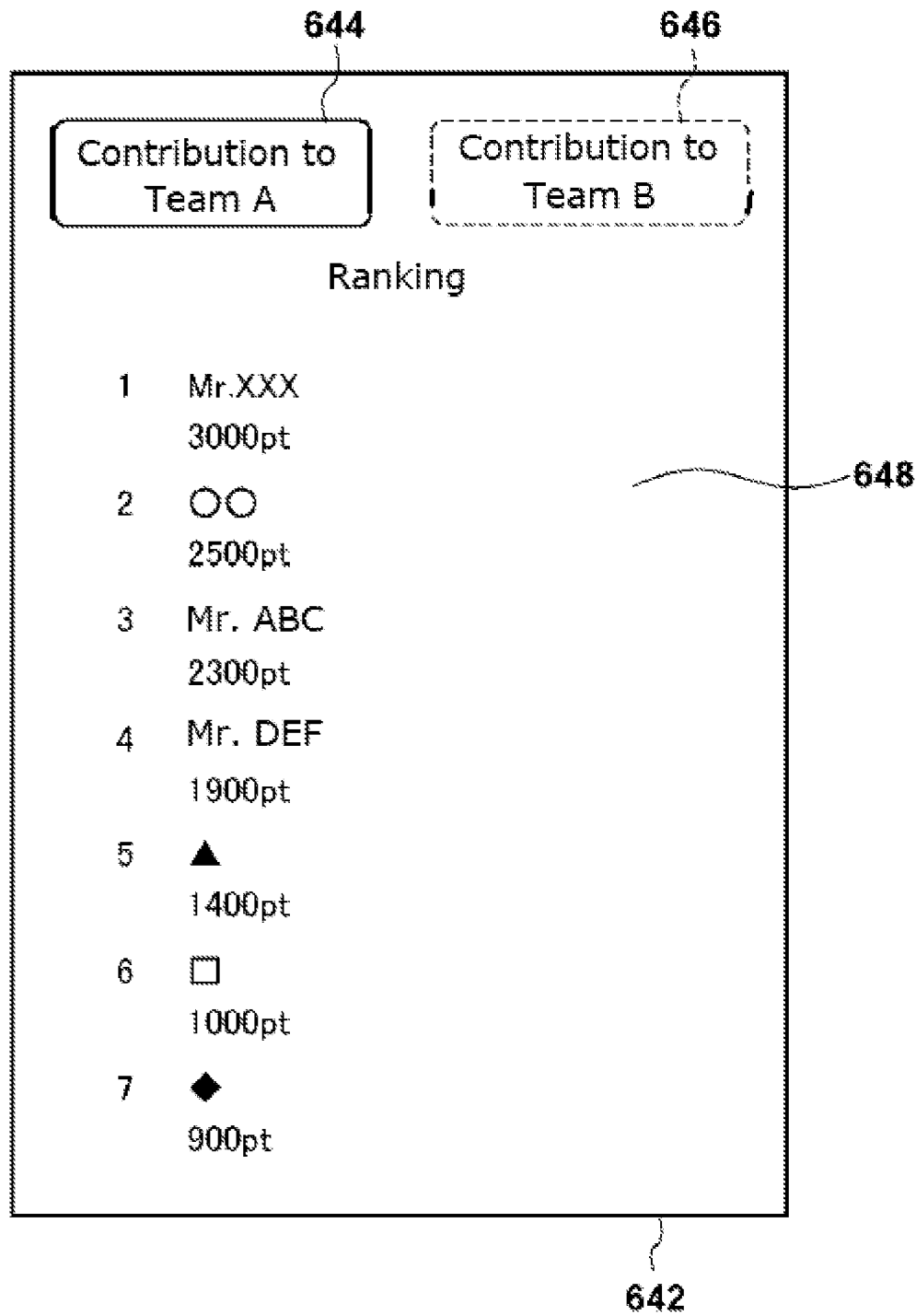
FIG. 15 is a representative screen image of a ranking screen displayed on the display of the viewer's user terminal.

FIG. 15 is a representative screen image of a ranking screen 642 displayed on the display of the viewer's user terminal 30. During the live-stream, the display of the distributor's user terminal 20 may display a screen showing the same information as the ranking screen 642. The ranking screen 642 has a button 644 for displaying the ranking of the contributions made to Team A, a button 646 for displaying the ranking of the contributions made to Team B, and a ranking display area 648. In FIG. 15, the ranking of the contributions made to Team A is displayed in the ranking display area 648. Therefore, the button 644 is active and the button 646 is non-active. The viewer may tap the button 646 if he/she wants to see the ranking of the contributions made to Team B. This switches what is displayed in the ranking display area 648 to the ranking of the contributions made to Team B.

The ranking display area 648 displays user names and their scores of contribution in the descendant order of the scores of contribution. The display control unit 202 generates the information to be displayed in the ranking display area 648 based on the ranking information generated by the ranking unit 310 of the server 10 or the updated ranking information contained in the response signal.

In the above embodiment, the live-streaming system 1 may comprise a holding unit for storing various information used for the service provided by the live-streaming system 1. The holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

The live-streaming system 1 relating to the present embodiment can live-stream team battle events where the viewer can use items that affect the life of the opposing team. This allows for a wider range of strategies in battle events. The live-streaming system 1 can offer more attractive battle events. When it comes to the communication between the distributor and the viewer, the distributor may simply ask the viewer to throw event-specific items, but the distributor and viewer may even cooperate with each other to discuss the life of the team to which the distributor belongs and the life of the opposing team and what can be done to win. They can thus make a strategy together, for example, decide an item to be thrown and when to throw. Such communication can strengthen the bond between the distributor and the viewer.

In addition, the live-streaming system 1 relating to the present embodiment can evaluate the scores of contribution made by the distributor to the teams, separately from the lives of the teams that may be increased or decreased, and rank the contributions made to each team based on the scores of contribution. In this manner, it can be determined which one of the teams wins while the teams can attack each other and defend from each other. In addition, it is also possible to honor the distributor who makes the largest contribution to each team.

<Hardware Configuration Example>

Figure 16:
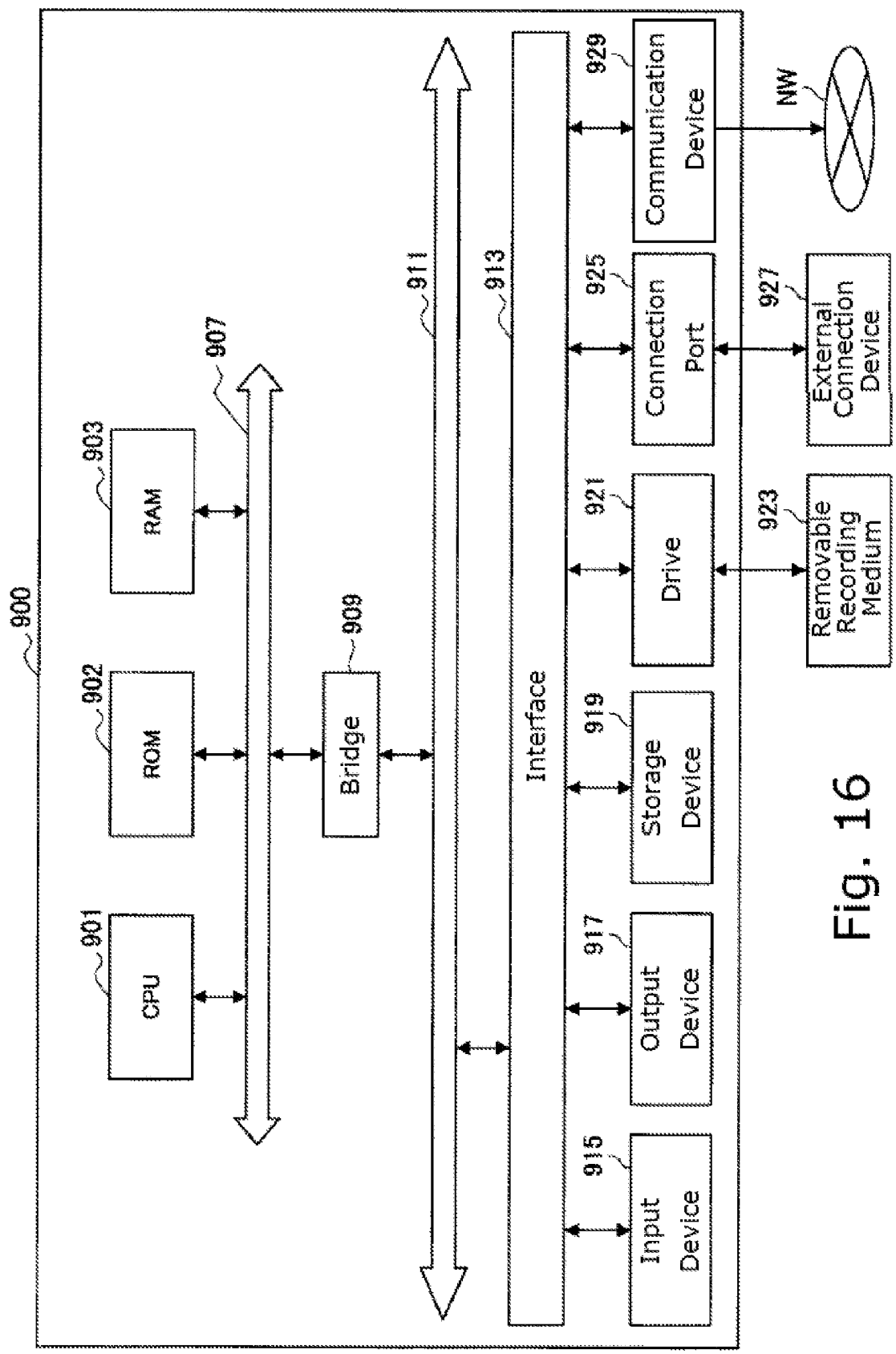
FIG. 16 is a block diagram showing an example of a hardware configuration of an information processing device according to the embodiment.

Referring to FIG. 16, the hardware configuration of the information processing device will be now described. FIG. 16 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs, calculation parameters, and the like used by the CPU 901. The RAM 903 serves as a primary storage that stores a program used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live-streaming system 1 in the embodiment have been described. This embodiment is a merely example, and it is understood by those skilled in the art that various modifications are possible for each component and a combination of each process, and that such modifications are also within the scope of the present disclosure.

The conversion rate from the price of the item to the points to be granted by the item, the conversion rate from the price of the item to the life, and the conversion rate of the price of the item to the score of the contribution in the embodiment are merely illustrative. The conversion rates may be appropriately set by the administrator of the live-streaming system 1, for example.

In the present embodiment, when the event-specific attack item is used, the life of the competitor team is decreased by an amount corresponding to the item. The present embodiment, however, is not limited to such. For example, a special move item may be set up that deals significant damage to the opposing team. In this case, the special move item may reduce the life of the opponent team by a fixed amount or by a randomly selected amount. Alternatively, a fever period may be established for each team or distributor, so that the attack item may produce a more significant effect than normal when used in the fever period. In this case, an object may be displayed on the live streaming room screen that indicates that it is currently the fever period, or such an object may be displayed only on the screen seen by the distributor. Alternatively, the effect of the attack item may depend on the length of the remaining period of the event period. For example, the effect produced by the attack item may increase as the remaining period decreases. Alternatively, the server 10 may be configured such that the effect of the event-specific attack or recovery item can be changed in any manner and the resulting effect may be notified only to the distributor. In this case, the distributor and the viewer can interact with each other in a new manner. For example, the distributor may maneuver the viewer such that the viewer may avoid using items while their effects are limited and use items while their effects are high. This contributes to formation of the sense of unity between the distributor and the viewer.

According to the present embodiment, the event-specific item is designed to affect the life when used by the viewer in a live-stream hosted by any distributor. The present embodiment, however, is not limited to such. For example, the life may not change if the event-specific item is used during reproduction of video data generated by a distributor who is not included in a predetermined number of top distributors in the ranking of the contributions determined by the ranking unit 310. For example, during a live-stream hosted by any of the top ten distributors in the ranking of contributions to Team A, the life updating unit 308 may change the life of Team B based on the effect produced by the event-specific attack item used by the viewer. During a live-stream hosted by any of the other distributors, however, the life updating unit 308 does not change the life of Team B based on the effect produced by the event-specific attack item used by the viewer. In this case, the event-specific attack item may be no longer displayed in the live stream hosted by any of the other distributors. This will make the event more exciting since the distributor making a lot of contribution to his/her team can feel special.

In the present embodiment, the event-specific attack and recovery items are configured as different items. The present embodiment, however, is not limited to such, and the event-specific item may be configured such that its effect can be designed or configured by the distributor. The server 10 may receive an indication from the distributor's user terminal 20 that indicates whether to use the event-specific item for attack or recovery, and change the life based on the indicated effect produced by the event-specific item. In this case, the event-specific items are not classified into attack and recovery items.

In the present embodiment, the scores of Teams A and B are separately and independently treated. The present embodiment, however, is not limited to such. A server relating to a first modification example may be configured to, when receiving an item usage signal indicating an event-specific item is used by a viewer in a live-stream, increase the life of one of the teams and decreases the life of the other team. In the first modification example, Teams A and B compete for the life of 100% in a battle event. If Team A acquires 45% of the life, Team B has 55% of the life. If the life of Team A increases by 5%, the life of Team B simultaneously decreases correspondingly, that is, by 5%. Accordingly, in the first modification example, increasing the life of Team A by using an event-specific item for Team A means decreasing the life of Team B by the same amount using the same item. In the first modification example, event-specific items are not divided into attack and recovery items.

Figure 17:
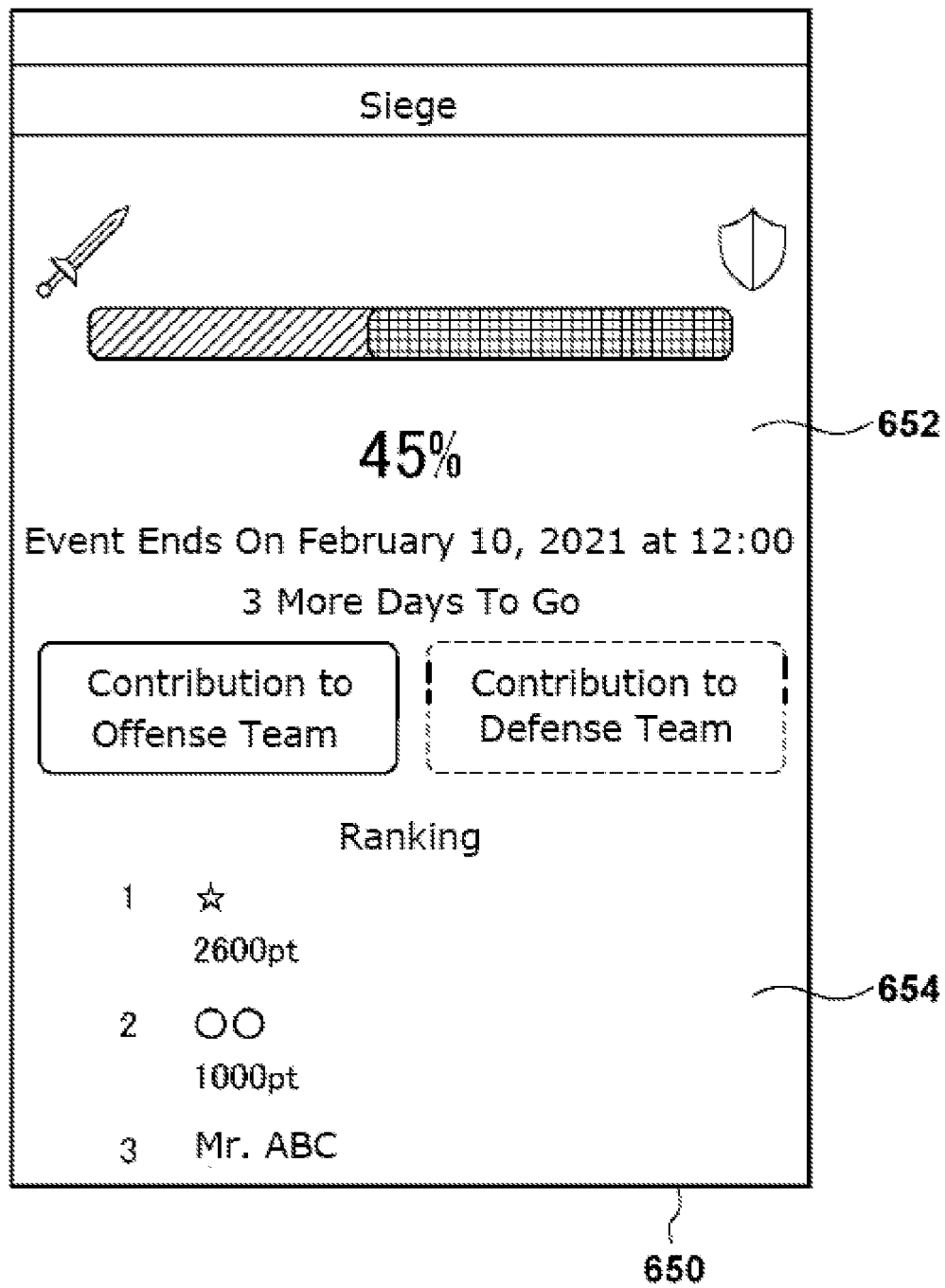
FIG. 17 is a representative screen image of a siege event screen displayed on the display of the viewer's user terminal.

FIG. 17 is a representative screen image of a siege event screen 650 displayed on the display of the viewer's user terminal 30. The siege event screen 650 has a status display area 652 showing the lives of Teams A and B and a ranking display area 654 configured in the same manner as the ranking screen 642 in FIG. 15. In the status display area 652, a bar indicates the lives. The left part of the bar indicates the life of Team A, and the right part indicates the life of Team B. In the example shown in FIG. 17, the life of Team A is shown as "45%." This means that the life of Team B is "55%."

In the first modification example, the life of Team A can be determined as the total of the effects produced by event-specific items used by viewers in live-streams hosted by the top ten distributors in the ranking of contributions made to Team A, and the life of Team B can be determined as the total of the effects produced by event-specific items used by viewers in live-streams hosted by the top ten distributors in the ranking of contributions made to Team B.

The technical idea according to the embodiment may be applied to live commerce or virtual live-streaming using an avatar that moves in synchronization with the movement of the distributor instead of the image of the distributor.

In the present embodiment, the event-specific item is configured to increase or decrease the life. The present embodiment, however, is not limited to such. The item is associated with an indicator for a team and may be configured to change the indicator in a first direction or in a second direction opposite to the first direction. In the present embodiment, the score of contribution may automatically determine the team to which the distributor belongs. The present embodiment, however, is not limited to such. For example, the distributor may register his/her team when he/she signs up for the event. In this case, the distributor DB stores the distributor and the team to which the distributor belongs in association with each other. The display control unit 202 controls the live-streaming room screen 610 such that the live-streaming room screen 610 presents only some of the event-specific attack and recovery items intended for the team to which the distributor belongs. In this manner, the viewer can be saved from making mistakes in selecting appropriate ones of the event-specific attack and recovery items. Alternatively, the event may be divided into two rounds, with the first round being designed to rank the items won by the distributors and to group the distributors into teams according to the ranking. For example, the server 10 may assign the odd-ranked distributors in the ranking determined in the first round to Team A and assign the even-ranked distributors to Team B.

In the present embodiment, it is two teams that compete against each other with one of them defeating the other in battle events. The present embodiment, however, is not limited to such. The technical concept of the present embodiment can be applied to battle events in which, for example, three or more teams compete against each other to win.

In the present embodiment, the event-specific item may produce different effects depending on the attribute of the distributor, the attribute of the viewer, and the relationship between the distributor and the viewer. For example, the effect of the event-specific item may be set such that the effect of the event-specific item used by the viewer increases as the time spent by the viewer with the live-streaming service decreases. Alternatively, the effect produced by the event-specific item may be set such that the effect of the event-specific item increases as the duration of the live-stream by the distributor increases. Alternatively, the effect of the event-specific item may be set such that the effect of the event-specific item used by a viewer in a live-stream of a distributor increases as the relationship between the distributor and the viewer grows strong.

The procedures described herein, particularly those described with a flow diagram, a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the user terminal where the video data is reproduced may be performed by the server 10 or may be performed by the user terminal where the video data is generated.

What is claimed is:

1. A server for live-streaming, comprising
    an event unit for conducting a competition event during an event period, the event period starting at a starting time and ending at an ending time;
    a first determining unit for determining a first team and a second team, the first team and the second team competing against each other in the competition event, the first team being determined to include a plurality of first distributors, the second team being determined to include a plurality of second distributors, each of the plurality of first distributors and the plurality of second distributors distributes a live-streaming in real time during the event period;
    a first changing unit for, upon receipt of a first signal, changing a first score of the first team by a first amount corresponding to a first item, the first signal being indicative that the first item has been used, in a first normal period during the event period, by one of a plurality of first viewers of a first live-streaming distributed by the plurality of the first distributors of the first team;

a second changing unit for, upon receipt of a second signal, changing a second score of the second team by a second amount corresponding to a second item, the second signal being indicative that the second item has been used by one of a plurality of second viewers of a second live-streaming distributed by at least one of the plurality of second distributors of the second team;

a period setting unit for transitioning the first team from the first normal period to a first special period, the first special period being different from the first normal period;

a third changing unit for, upon receipt of a third signal, changing the first score of the first team by a third amount which is greater than the first amount, the third signal being indicative that the first item has been used, in the first special period during the event period, by another one of the first viewers of the first live-streaming; and a second determining unit for determining a winning team upon satisfaction of a predetermined condition by at least one of the first score of the first team or the second score of the second team.

2. The server of claim 1, wherein
the second changing unit, upon receipt of the second signal, changes the second score of the second team, the second signal being indicative that the second item has been used, in a second normal period, by a viewer of a live-streaming conducted by a distributor who belongs to the second team, wherein the server further comprises:

a fourth changing unit for, upon receipt of a fourth signal, changing the second score of the second team by a fourth amount which is greater than the second amount, the fourth signal being indicative that the second item has been used, in a second special period which is different from the second normal period, by a viewer of a live-streaming conducted by a distributor who belongs to the second team.

3. A method comprising:
conducting a competition event during an event period, the event period starting at a starting time and ending at an ending time;

determining a first team and a second team, the first team and the second team competing against each other in the competition event, the first team being determined to include a plurality of first distributors, the second team being determined to include a plurality of second distributors, each of the plurality of first distributors and the plurality of second distributors distributes a live-streaming in real time during the event period;

upon reception of a first signal, changing a first score of the first team by a first amount corresponding to a first item, the first signal being indicative that the first item has been used, in a first normal period during the event period, by one of a plurality of first viewers of a first live-streaming distributed by the plurality of the first distributors of the first team;

upon reception of a second signal, changing a second score of the second team by a second amount corresponding to a second item, the second signal being indicative that the second item has been used by one of a plurality of second viewers of a second live-streaming distributed by at least one of the plurality of second distributors of the second team;

transitioning the first team from the first normal period to a first special period, the first special period being different from the first normal period;

upon reception of a third signal, changing the first score of the first team by a third amount which is greater than the first amount, the third signal being indicative that the first item has been used, in the first special period during the event period, by another one of the first viewers of the first live-streaming; and determining a winning team upon satisfaction of a predetermined condition by at least one of the first score of the first team or the second score of the second team.

4. The method of claim 3, wherein
the changing the second score includes, upon receipt of the second signal, changing the second score of the second team, the second signal being indicative that the second item has been used, in a second normal period, by a viewer of a live-streaming conducted by a distributor who belongs to the second team, wherein the method further comprises:

upon reception of a fourth signal, changing the second score of the second team by a fourth amount which is greater than the second amount, the fourth signal being indicative that the second item has been used, in a second special period which is different from the second normal period, by a viewer of a live-streaming conducted by a distributor who belongs to the second team.

* * * * *